United States Patent
Li et al.

(10) Patent No.: US 10,963,715 B2
(45) Date of Patent: Mar. 30, 2021

(54) DEVICE AND METHOD FOR BIOMETRIC RECOGNITION AND METHOD FOR REGISTERING BIOMETRIC TEMPLATE

(71) Applicants: Chipone Technology (Beijing) Co., Ltd., Beijing (CN); Chipone System Technology (Beijing) Co., Ltd., Beijing (CN)

(72) Inventors: Kun Li, Beijing (CN); Dong Xu, Beijing (CN); Lei Fan, Beijing (CN); Jinfang Zhang, Beijing (CN)

(73) Assignees: CHIPONE TECHNOLOGY (BEIJING) CO., LTD, Beijing (CN); CHIPONE SYSTEM TECHNOLOGY (BEIJING) CO., LTD, Beijing (CN)

(*) Notice: Subject to any disclaimer, the term of this patent is extended or adjusted under 35 U.S.C. 154(b) by 0 days.

(21) Appl. No.: 16/309,324

(22) PCT Filed: Jun. 9, 2017

(86) PCT No.: PCT/CN2017/087777
§ 371 (c)(1),
(2) Date: Dec. 12, 2018

(87) PCT Pub. No.: WO2017/215533
PCT Pub. Date: Dec. 21, 2017

(65) Prior Publication Data
US 2019/0332878 A1    Oct. 31, 2019

(30) Foreign Application Priority Data
Jun. 12, 2016 (CN) .......................... 201610412329.8

(51) Int. Cl.
*G06K 9/00* (2006.01)
*G06K 19/07* (2006.01)
*H04L 9/32* (2006.01)

(52) U.S. Cl.
CPC ..... *G06K 9/00926* (2013.01); *G06K 9/00067* (2013.01); *G06K 9/00087* (2013.01); *G06K 19/0718* (2013.01); *H04L 9/3247* (2013.01)

(58) Field of Classification Search
CPC .......... G06K 9/00926; G06K 9/00067; G06K 9/00087; G06K 19/0718; H04L 9/3247
See application file for complete search history.

(56) References Cited

U.S. PATENT DOCUMENTS 7,162,058 B2    1/2007    Mimura et al.
7,457,442 B2    11/2008   Mimura et al.
(Continued)

FOREIGN PATENT DOCUMENTS

CN    1355501 A       6/2002
CN    1885315 A    *  12/2006
(Continued)

OTHER PUBLICATIONS

International Search Report and Written Opinion for International Application No. PCT/CN2017/087777, dated Jul. 28, 2017, 6 pages.
(Continued)

*Primary Examiner* — Stephen G Sherman
(74) *Attorney, Agent, or Firm* — Westman, Champlin & Koehler, P.A.

(57) ABSTRACT

A device for biometric recognition, a method for biometric recognition and a method for registering a biometric template are disclosed herein. The device for biometric recognition, comprises: a sensor configured to sense biometric information of a biometric feature; a microprocessor configured to obtain the biometric information from the sensor
(Continued)

and perform image preprocessing and feature extraction on the obtained biometric information, in order to obtain biometric data; and a security chip configured to store a biometric template, compare the obtained biometric data with the stored biometric template, in order to determine a biometric recognition result. Compared to conventional and logical isolating solutions, the embodiments of the present disclosure improves the security of biometric recognition.

10 Claims, 4 Drawing Sheets

(56) References Cited

U.S. PATENT DOCUMENTS

| | | | |
|---|---|---|---|
| 9,112,705 | B2 | 8/2015 | Monden |
| 10,142,114 | B2 | 11/2018 | Monden |
| 2002/0018585 | A1* | 2/2002 | Kim ................ G06Q 20/40145 |
| | | | 382/125 |
| 2002/0150283 | A1 | 10/2002 | Mimura et al. |
| 2007/0076925 | A1 | 4/2007 | Mimura et al. |
| 2010/0287369 | A1 | 11/2010 | Monden |
| 2015/0127965 | A1* | 5/2015 | Hong ................... G06F 1/1694 |
| | | | 713/323 |
| 2015/0333911 | A1 | 11/2015 | Monden |
| 2016/0048840 | A1* | 2/2016 | Lee .................... G06Q 20/3227 |
| | | | 382/124 |
| 2016/0253670 | A1* | 9/2016 | Kim .................... G06Q 20/4012 |
| | | | 705/72 |

FOREIGN PATENT DOCUMENTS

| | | |
|---|---|---|
| CN | 103646203 A | 3/2014 |
| CN | 104573661 A | 4/2015 |
| CN | 105516168 A | 4/2016 |
| CN | 105975837 A | 9/2016 |
| CN | 206162536 U | 5/2017 |
| JP | 1992352548 A | 12/1992 |
| JP | 1998149446 A | 6/1998 |
| JP | 2001344213 A | 12/2001 |
| JP | 2002297552 A | 10/2002 |
| JP | 2009205441 A | 3/2011 |
| WO | 2007094165 A1 | 8/2007 |

OTHER PUBLICATIONS

First Office Action, for Japanese Patent Application No. 2018-565012, dated Feb. 27, 2020 11 pages.
First Office Action, for Korean Patent Application No. 10-2019-7001134, dated Apr. 18, 2020, 12 pages.
Second Office Action, for Japanese Patent Application No. 2018-565012, dated Aug. 27, 2020 9 pages.

* cited by examiner

DEVICE AND METHOD FOR BIOMETRIC RECOGNITION AND METHOD FOR REGISTERING BIOMETRIC TEMPLATE

CROSS-REFERENCE TO RELATED APPLICATION

This application is a Section 371 National Stage application of International Application No. PCT/CN2017/087777, filed on 9 Jun. 2017, which published as WO 2017/215533 A1 on 21 December 2017, and claims priority to Chinese Patent Application No. 201610412329.8, filed on Jun. 12, 2016, entitled as 'device and method for biometric recognition and method for registering biometric template', the contents of which are incorporated herein by reference in their entireties.

BACKGROUND OF THE DISCLOSURE

Field of the Disclosure

The present disclosure relates to the field of biometric recognition technology, and more particularly, to a device for biometric recognition, a method for biometric recognition and a method for registering a biometric template.

Description of the Related Art

Biometric features, such as fingerprints, irises and faces, are applied in the field of identity authentication extensively and gradually due to their uniqueness, privacy, immutability, etc. In traditional biometric recognition solutions, stored biometric templates may contain a large amount of original biometric information, and some biometric templates are even images of biometric features. Once the biometric templates are lost or stolen, an intruder can pass verification by using the biometric information included in the biometric templates directly, and can further implement cross-verification among databases of different applications, for example, information of a fingerprint template stolen from a fingerprint access control system can be used to gain access to a corresponding personal bank account relying on fingerprints. A biometric sample can even be forged directly from a corresponding biometric template, for example, a fingerprint may be forged from a corresponding template of fingerprint minutiae. Meanwhile, due to the immutability of biometric features, once the original biometric information is revealed, the resulting damage will be permanent and extensive. Therefore, security protection for the biometric templates in a biometric recognition system is very important.

Currently, Trust Zone security technique (or Secure Enclave security technique) is commonly used in computing devices, such as smart phones, tablet computers and the like, which are configured to run IOS or Android operating system and logically divide the system environment into security zones and non-security zones, and the biometric registration and the recognition are performed in the security zones. However, the division of security zones and non-security zones is purely logical, so that the information relative to the biometric features is still easy to be stolen during the processes of transmission, storage and calculation, and as a result, an overall security level of the biometric recognition is still not strong enough.

SUMMARY OF THE DISCLOSURE

The embodiments of the present disclosure provide a device for biometric recognition, a method for biometric recognition and a method for registering a biometric template, in order to improve security on biometric recognition.

According to a first aspect of the disclosure, there is provided a device for biometric recognition, comprising: a sensor configured to sense biometric information of a biometric feature; a microprocessor configured to obtain the biometric information from the sensor and perform image preprocessing and feature extraction on the obtained biometric information, in order to obtain biometric data; and a security chip configured to store a biometric template, compare the biometric data obtained from the microprocessor with the stored biometric template, in order to determine a biometric recognition result.

In some embodiments, the microprocessor comprises: an image obtaining module configured to obtain the biometric information from the sensor; an image preprocessing module configured to preprocess the biometric information obtained by the image obtaining module in order to obtain a grayscale image of the biometric feature; and a feature extraction module configured to extract feature points of the biometric feature from the grayscale image provided by the image preprocessing module to obtain the biometric data relative to the feature points of the biometric feature.

In some embodiments, the security chip comprises: a memory module configured to store the biometric template, wherein the microprocessor is configured to obtain the biometric information sensed by the sensor, perform image preprocessing and feature extraction on the biometric information in order to generate the biometric template during a registering phase; and a feature comparison module configured to compare the biometric data obtained by the microprocessor with the biometric template stored in the memory module, and determine that the biometric recognition result is passed if the biometric data matches the biometric template and otherwise the biometric recognition result is failed.

In some embodiments, the security chip further comprises a signature module configured to digitally sign the biometric recognition result.

In some embodiments, the microprocessor is a microcontroller unit (MCU) and the security chip is a security element (SE).

In some embodiments, the device for biometric recognition is installed in a computing device, and the microprocessor and the security chip are physically isolated from a system environment of the computing device.

In some embodiments, the computing device is divided into security zones and non-security zones, and the device for biometric recognition is configured to send the biometric recognition result to the computing device through the security zones or the non-security zones.

In some embodiments, the biometric feature comprises a fingerprint, the biometric information comprises image information of the fingerprint, and the biometric data comprises feature point data of the fingerprint, the biometric template comprises a template of the fingerprint.

According to a second aspect of the disclosure, there is provided a method for biometric recognition comprising: sensing biometric information of a biometric feature by a sensor in accordance with an instruction to identify the biometric feature; obtaining the biometric information from the sensor by a microprocessor, and performing image preprocessing and feature extraction on the obtained biometric information by the microprocessor, in order to obtain biometric data; and comparing the biometric data obtained by the microprocessor with a biometric template stored in a security chip by use of the security chip, in order to determine a biometric recognition result.

In some embodiments, step of comparing the biometric data obtained by the microprocessor with the biometric template stored in the security chip by use of the security chip in order to determine the biometric recognition result comprises: in the security chip, comparing the biometric data obtained by the microprocessor with the biometric template stored in the security chip, wherein if the biometric data matches the biometric template, the biometric recognition result is determined to be passed, otherwise the biometric recognition result is determined to be failed.

According to a third aspect of the present disclosure, there is provided a method for registering a biometric template, comprising: sensing biometric information by a sensor in accordance with an instruction to register the biometric template; obtaining the biometric information from the sensor by a microprocessor, performing image preprocessing and feature extraction on the obtained biometric information by the microprocessor, in order to obtain biometric data; and storing the biometric data obtained by the microprocessor as the biometric template in a security chip.

BRIEF DESCRIPTION OF THE DRAWINGS

In order to explain the technical solutions according to the embodiments of the present disclosure more clearly, drawings of the embodiments will be briefly described in the following description. Obviously, the drawings in the following description only relate to some embodiments of the present disclosure, and are not intended to limit the disclosure.

DETAILED DESCRIPTION OF THE DISCLOSURE

To make the objectives, technical solutions, and advantages of the embodiments of the present disclosure clear, the technical solutions of the embodiments of the present disclosure will be described in connection with the drawings of the embodiments of the present disclosure clearly and completely. Apparently, the described embodiments are only some of the embodiments of the present invention, not all of the embodiments. Based on the embodiments in the present invention, all other embodiments obtained by those ordinary skilled in the art on the premise of not contributing creative efforts belong to a protection scope of the present invention.

Figure 1:
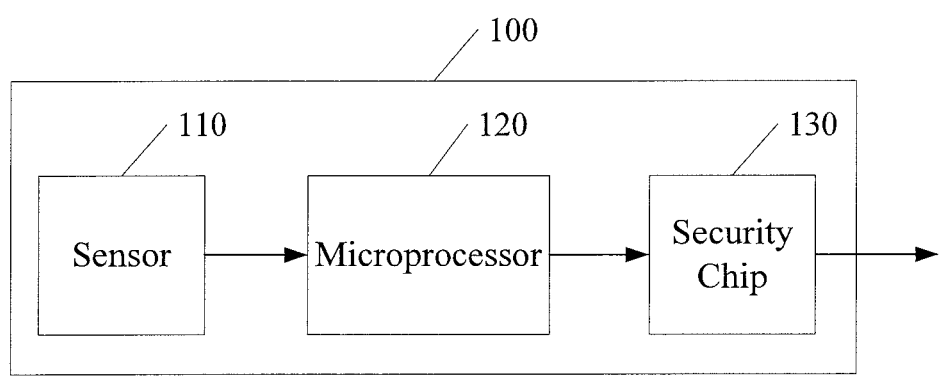
FIG. 1 shows a block diagram of a device for biometric recognition according to an embodiment of the present disclosure.

FIG. 1 shows a block diagram of a device 100 for biometric recognition according to an embodiment of the present disclosure. As shown in FIG. 1, the device 100 for biometric recognition comprises a sensor 110, a microprocessor 120 and a security chip 130. The sensor 110 is for sensing biometric information of a biometric feature. The microprocessor 120 is for obtaining the biometric information from the sensor, and performing image preprocessing and feature extraction on the obtained biometric information, in order to obtain biometric data. The security chip 130 is for storing a biometric template, and comparing the stored biometric template with the biometric data obtained from the microprocessor, in order to determine a biometric recognition result.

In some embodiments, the microprocessor 120 may comprise: an image obtaining module configured to obtain the biometric information from the sensor 110; an image preprocessing module configured to preprocess the biometric information obtained by the image obtaining module in order to obtain a grayscale image of the biometric feature; a feature extraction module configured to extract feature points of the biometric feature from the grayscale image provided by the image preprocessing module to obtain the biometric data relative to the feature points of the biometric feature.

In some embodiments, the security chip 130 may comprise: a memory module configured to store the biometric template, wherein the biometric template is generated during a registering phase by obtaining the biometric information sensed by the sensor and performing image preprocessing and feature extraction by use of the microprocessor 120; and a feature comparison module configured to compare the biometric data obtained by the microprocessor 120 and the biometric template stored in the memory module, and determine that the biometric recognition result is passed if the biometric data matches the biometric template and otherwise the biometric recognition result is failed.

In some embodiments, the security chip 130 may further comprise a signature module for digitally signing the biometric recognition result.

In some embodiments, the microprocessor 120 may be a microcontroller unit (MCU) and the security chip 130 may be a secure element (SE).

In some embodiments, the device 100 for biometric recognition may be installed in a computing device, and the microprocessor 120 and the security chip 130 are physically isolated from a system environment of the computing device.

In some embodiments, the computing device may be divided into security zones and non-security zones, and the device 100 for biometric recognition may send the biometric recognition result to the computing device through the security zones or the non-security zones.

In some embodiments, the biometric feature may comprise a fingerprint, the biometric information may comprise image information of the fingerprint, and the biometric data may comprise feature point data of the fingerprint, the biometric template may comprise a template of the fingerprint.

Figure 2:
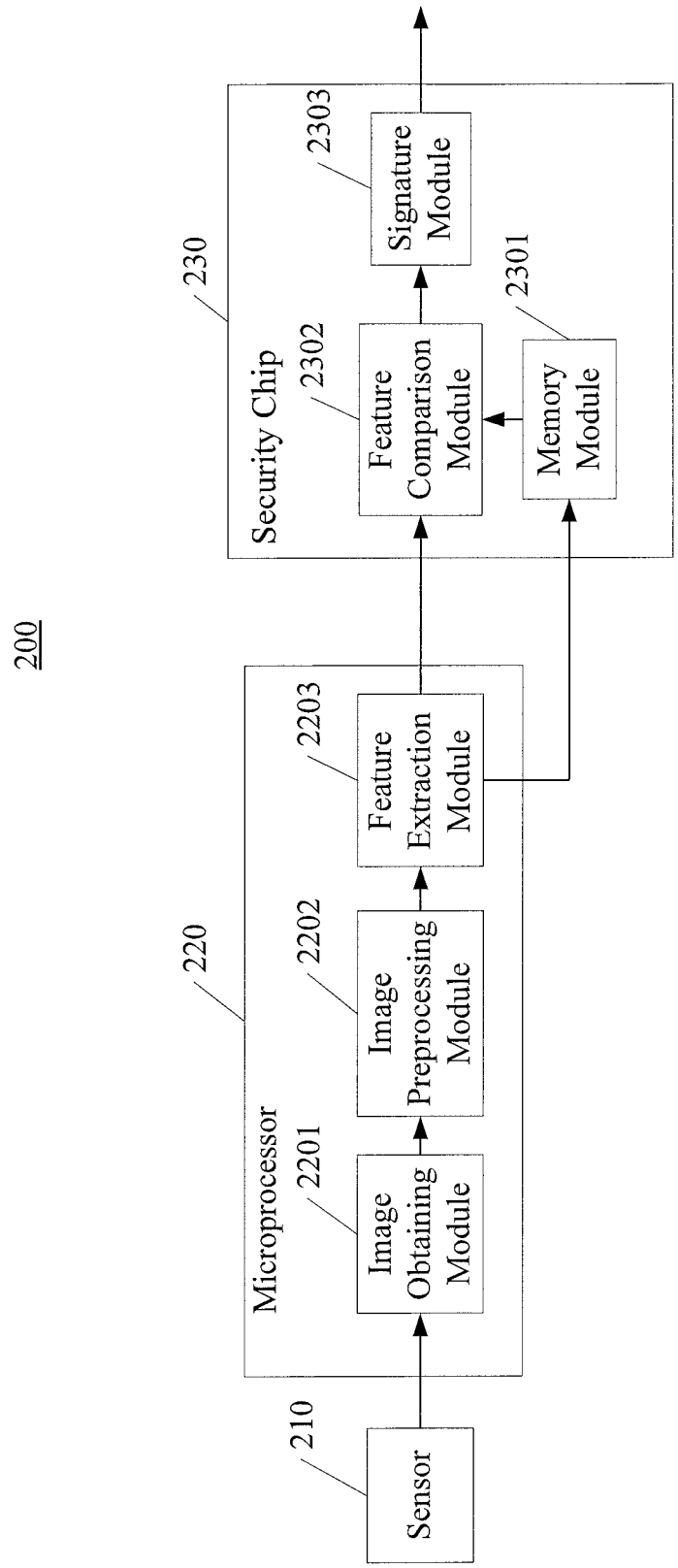
FIG. 2 shows a block diagram of a device for biometric recognition according to an embodiment of the present disclosure.

FIG. 2 shows a block diagram of a device 200 for biometric recognition according to an embodiment of the present disclosure. The embodiment of the disclosure is applicable for identifying one or more biometric features, exemplary biometric features include but are not limited to textures (comprising fingerprints, palm prints, veins and related accessory features, such as sweat holes, etc.), biofilms (e.g., irises, retinas, etc.), faces, ear canals, voices, body shapes and personal habits (such as strength and frequency of keystrokes, signatures, gaits), etc. In the embodiment, the biometric feature can be for example, a fingerprint.

As shown in FIG. 2, a device 200 for biometric recognition comprises a sensor 210, a microprocessor 220 and a security chip 230. In some embodiments, the device 200 for biometric recognition may be installed in a computing device such as a smart phone, a tablet computer or the like, each of the microprocessor 220 and the security chip 230 is an individual physical hardware which is physically isolated from a system environment of the computing device.

The sensor 210 is for sensing biometric information. The biometric information may comprise related information on one or more biometric features such as textures (comprising fingerprints, palm prints, veins and related accessory features such as sweat holes, etc.), biofilms (e.g., irises, retinas, etc.), faces, ear canals, voices, body shapes and personal habits (such as strength and frequency of keystrokes, signatures, gaits), etc. In an application for identifying a fingerprint, for example, the biometric information may comprise an image information of the fingerprint. In the embodiment of the present disclosure, the sensor 210 may be an optical sensor, a semiconductor sensor, an ultrasonic sensor, a radio frequency identification sensor, or any other sensor that may sense the biometric information.

The microprocessor 220 may comprise an image obtaining module 2201, an image preprocessing module 2202 and a feature extraction module 2203. In some embodiments, the microprocessor 220 may be a microcontroller unit (MCU).

The image obtaining module 2201 is for obtaining the biometric information from the sensor 210. For example, in an application for identifying a fingerprint, the image obtaining module 2201 may obtain image information of the fingerprint one or more times from the sensor 210 in a sliding acquisition mode or a pressure acquisition mode.

The image preprocessing module 2202 is for performing a preprocessing on the biometric information obtained by the image obtaining module 2201, in order to obtain a grayscale image of the biometric feature. For example, the preprocessing for a fingerprint image may comprise image normalization processing, fingerprint effective area segmentation processing, processing based on a fingerprint direction map, fingerprint enhancement processing, fingerprint binarization processing, fingerprint refinement processing and the like.

The feature extraction module 2203 is for extracting feature points of the biometric feature from the grayscale image obtained by the image preprocessing module 2202, in order to obtain biometric data related to the feature points of the biometric feature. For example, the biometric data may comprise feature point data of a fingerprint.

The security chip 230 may comprise a memory module 2301, a feature comparison module 2302, and a signature module 2303. In some embodiments, the security chip 130 may be a secure element.

The memory module 2301 is for storing a biometric template such as a fingerprint feature template or the like. The biometric template is generated during a registering phase by obtaining the biometric information sensed by the sensor 210 and performing image preprocessing and feature extraction on the biometric information by use of the microprocessor 220. In the embodiment of the present disclosure, the memory module 2301 may be a nonvolatile memory such as a flash memory, an electrically erasable programmable read only memory (EEPROM), an erasable programmable read only memory (EPROM), a programmable read-only memory (PROM) or other magnetic or electrical storage media where data can be retained continuously in case of power failure.

The feature comparison module 2302 is for comparing the biometric data obtained from the microprocessor 220 with the biometric template stored in the memory module 2301, and if the biometric data matches the biometric template, the biometric recognition result is determined to be passed, otherwise the biometric recognition result is determined to be failed.

The signature module 2303 is for signing the biometric recognition result digitally. For example, the signature module 2303 may be used to generate a key pair after the biometric template is registered successfully, store a private key of the key pair in the security chip, and send a public key of the key pair to an external application server, and after the biometric feature is identified, the signature module 2303 may be used to digitally sign the biometric recognition result with the private key. After receiving the signed biometric recognition result, the application server may use the public key to verify whether the signed biometric recognition result is valid or not. In this way, the biometric recognition result output from the security chip can be prevented from being tampered by Trojans or other computer viruses in an open application environment, thus behaviors which are not verified by fingerprint recognition are prevented from being accessed and authorized.

In some embodiments, the device 100 for biometric recognition may be installed in a computing device divided into security zones and non-security zones, and may send the biometric recognition result to the computing device through the security zones or the non-security zones. For example, the device 100 for biometric recognition may be installed in the computing device using Trust Zone security technique (or Secure Enclave security technique), such as smart phones, tablet computers and the like, and may communicate with the computing device through non-security zones or security zones in processor. As an example, the device 100 for biometric recognition may perform biometric recognition (e.g., fingerprint recognition) based on an instruction sent from the computing device, and may send the signed or unsigned biometric recognition result to the computing device through the non-security zones or the security zones of the computing device.

Figure 3:
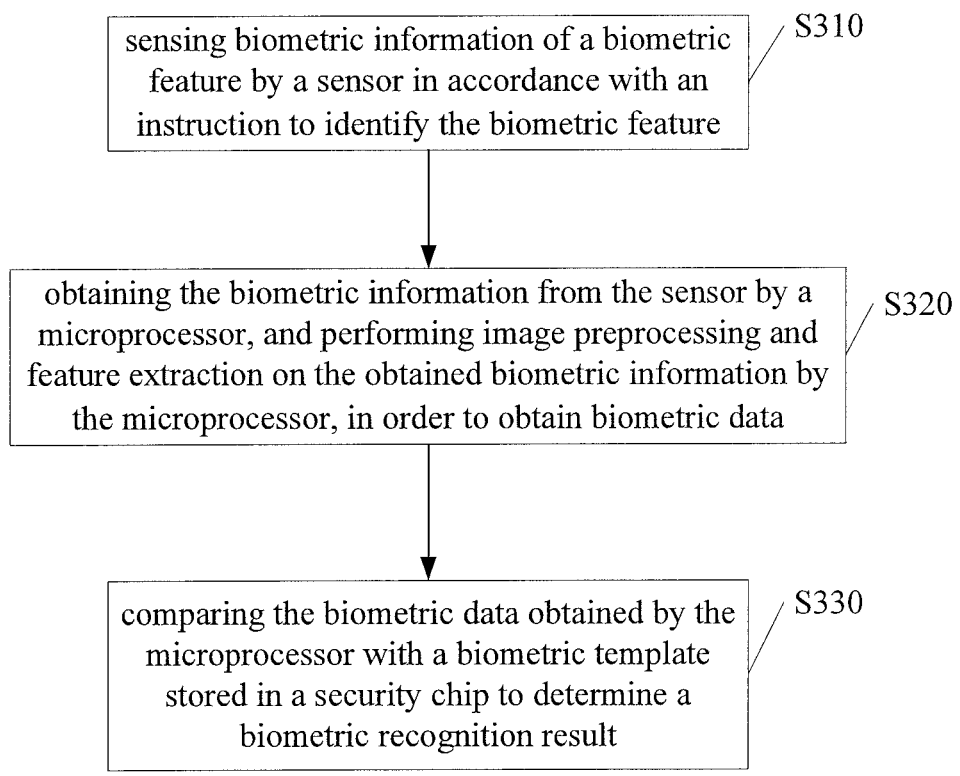
FIG. 3 shows a diagram of a method for biometric recognition according to an embodiment of the present disclosure.

FIG. 3 shows a diagram of a method 300 for biometric feature according to an embodiment of the present disclosure.

In step S310, in accordance with an instruction to identify the biometric feature, biometric information, e.g., image information of a fingerprint, is sensed by a sensor. The instruction to identify the biometric feature may be sent from a computing device, such as a smart phone, a tablet computer and the like.

The step S320, a microprocessor is configured to obtain the biometric information from the sensor, and perform image preprocessing and feature extraction on the obtained biometric information, in order to obtain biometric data. For example, the microprocessor may obtain the biometric information (e.g., image information of the fingerprint) from the sensor, preprocess on the obtained biometric information in order to obtain a grayscale image of the biometric feature, and extract feature points of the biometric feature from the obtained grayscale image in order to obtain the biometric data relative to the feature points of the biometric feature. For example, for fingerprint recognition, the feature point data of the fingerprint can be obtained.

In step S330, the biometric data obtained by the microprocessor and the biometric template (e.g., a fingerprint feature template) stored in the security chip are compared with each other by the security chip, in order to determine the biometric recognition result. For example, the biometric data obtained by the microprocessor and the biometric template stored in the security chip can be compared in the security chip, if the biometric data matches the biometric template, the biometric recognition result is determined to be passed, otherwise the biometric recognition result is determined to be failed. In some embodiments, the biometric template such as a fingerprint feature template or the like may be generated during the registering phase by obtaining the biometric information sensed by the sensor and performing image preprocessing and feature extraction by use of the microprocessor, and may be stored in the memory (e.g., a nonvolatile memory) of the security chip. The nonvolatile memory comprises but is not limited to a flash memory, an electrically erasable programmable read only memory (EEPROM), an erasable programmable read only memory (EPROM), a programmable read-only memory (PROM) or other magnetic or electrical storage media where data can be retained continuously in case of power failure.

In some embodiments, the method 300 may further comprise: digitally signing the biometric recognition result. For example, a key pair may be generated after the biometric template is registered successfully, a private key of the key pair can be stored in the security chip, and a public key of the key pair can be sent to an external application server, and after the biometric feature is identified, the biometric recognition result can be digitally signed with the private key. After receiving the signed biometric recognition result, the application server may use the public key to verify whether the signed biometric recognition result is valid or not.

In some embodiments, the method 300 may further comprise: sending the biometric recognition result to the computing device. As an example, for the computing device using Trust Zone security technique (or Secure Enclave technique) such as a smart phone, a tablet computer or the like, the signed or unsigned biometric recognition result may be sent to the computing device through the non-security zones or the security zones in the computing device.

In some embodiments, the microprocessor may be a microcontroller unit (MCU) and the security chip may be a security element (SE).

In some embodiments, the microprocessor and the security chip are physically isolated from a system environment of the computing device.

Figure 4:
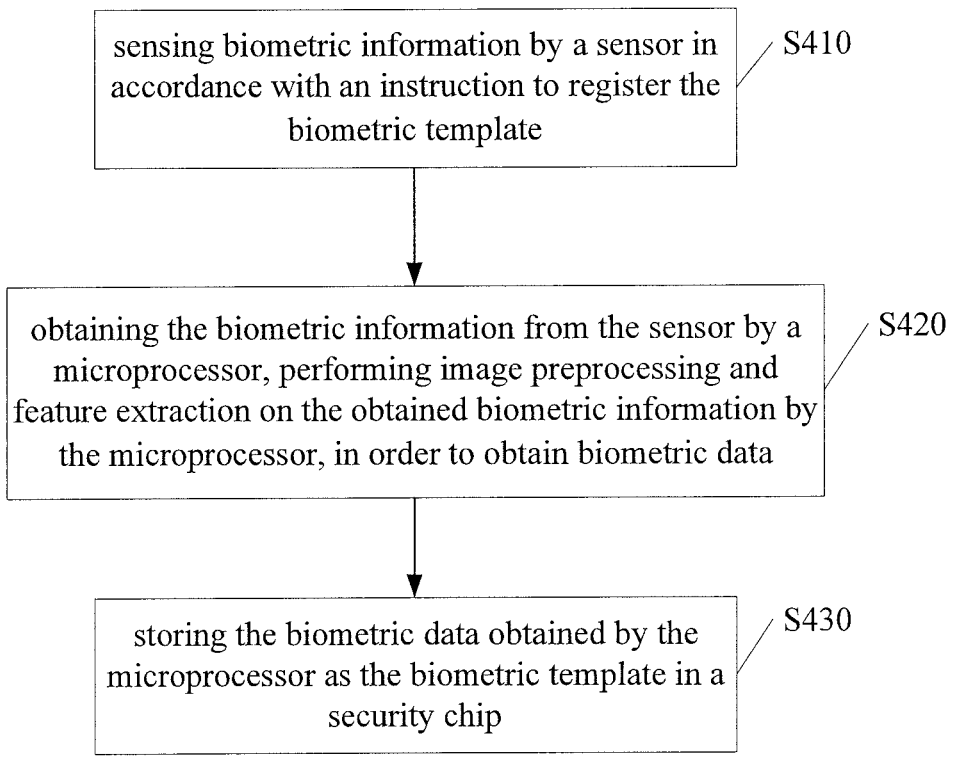
FIG. 4 shows a diagram of a method for registering a biometric template according to an embodiment of the present disclosure.

FIG. 4 shows a diagram of a method 400 for registering a biometric template according to an embodiment of the present disclosure.

In step S410, in accordance with an instruction to register the biometric template, the biometric information, e.g., image information of a fingerprint, is sensed by a sensor. The instruction to register the biometric template may be sent from the computing device, such as a smart phone, a tablet computer and the like.

In step S420, a microprocessor is configured to obtain the biometric information from the sensor, and perform image preprocessing and feature extraction on the obtained biometric information, in order to obtain biometric data. For example, the microprocessor may obtain the biometric information (e.g., image information of the fingerprint) from the sensor, preprocess on the obtained biometric information in order to obtain a grayscale image of the biometric feature, and extract feature points of the biometric feature from the obtained grayscale image in order to obtain the biometric data relative to the feature points of the biometric feature. For example, for fingerprint recognition, the feature point data of the fingerprint can be obtained.

In step S430, the biometric data obtained by the microprocessor may be stored as the biometric template in the security chip. For example, the biometric data obtained by the microprocessor can be stored as the biometric template in the memory (e.g., a nonvolatile memory) of the security chip. The nonvolatile memory comprises but is not limited to a flash memory, an electrically erasable programmable read only memory (EEPROM), an erasable programmable read only memory (EPROM), a programmable read-only memory (PROM) or other magnetic or electrical storage media where data can be retained continuously in case of power failure.

In some embodiments, the microprocessor and the security chip are physically isolated from a system environment of the computing device.

In the embodiments of the present disclosure, the whole process for biometric recognition is independent from the system environment of the computing device such as a smart phone, a tablet computer or the like, in order to avoid in-between transmission, storage and calculations performed in the open system environment. Specifically, the microprocessor and the system environment of the computing device are physically isolated with each other, in order to prevent cyber-attacks during processes of registering and identifying; and the security chip is also physically isolated from the system environment of the computing device for preventing the biometric template stored inside the security chip from cyber-attacks, and has a relatively strong capability on security protection for preventing data in the biometric template from physical attacks and non-invasive attacks during processes of storage and computing. Thus, compared to conventional and logical isolating solutions, the embodiments of the present disclosure greatly improve the security of biometric recognition, especially the security of fingerprint recognition.

According to the embodiments of the present disclosure, on one hand, the process of image obtaining, image preprocessing, feature extraction and other processes, each of which requires a large amount of computation, are performed in the microprocessor, so that the processing efficiency can be improved, the requirements on computation capability and storage capability can be lowered, and implementation flexibility can be achieved; on the other hand, the processes of storing the biometric template, feature comparison and other processes, each of which is related to the security of the biometric template, are performed in the security chip, so that the biometric template is always ensured to be physically isolated from the open host environment and be transmitted and stored in a high-security environment. Thus, compared to conventional biometric recognition solutions, the embodiments of the present disclosure not only have a higher security level, but also have a higher processing efficiency and can be implemented in more flexible ways.

The device for biometric recognition according to the embodiments of the present disclosure may be installed in a variety of computing devices, such as a smart phone or a tablet computer using Trust Zone technique (or Secure Enclave technique). The process of storing the biometric template, process of feature comparison and other processes, each of which is related to the security of the biometric template, are performed in the security chip, and the biometric template is always physically isolated from the open host environment, so that the biometric recognition result provided by the security chip can be transmitted in the non-security zones of the computing device, or in the security zones for further enhancing the security level. The device for biometric recognition in the embodiments of the present disclosure can also be installed in a computing device which is not divided into security zones and non-security zones. It is obvious that the embodiments of the present disclosure are suitable for a variety of computing devices, such as smart phones, tablet computers and so on, thus having a high compatibility.

The above description is merely exemplary embodiments of the present disclosure and is not intended to limit the scope of the present disclosure. The protection scope of the present disclosure is determined by the appended claims.

The invention claimed is:

1. A device for biometric recognition, comprising:
   a sensor configured to sense biometric information of a biometric feature;
   a microprocessor configured to receive the biometric information directly from the sensor and perform image preprocessing and feature extraction on the obtained biometric information, in order to obtain biometric data; and
   a security chip configured to store a biometric template, compare the biometric data obtained from the microprocessor with the stored biometric template, in order to determine a biometric recognition result,
   wherein the device for biometric recognition is installed in a computing device, each of the microprocessor and the security chip is an individual physical hardware which is physically isolated from a system environment of the computing device,
   wherein the security chip is further configured to digitally sign the biometric recognition result by use of a private key stored in the security chip after the biometric recognition result is determined, and a public key sis stored in a external of the security chip to verify whether the signed biometric recognition results is valid or not,
   wherein the private key and the public key are a key pair generated in the security chip.

2. The device according to claim 1, wherein the microprocessor comprises:
   an image obtaining module configured to obtain the biometric information from the sensor;
   an image preprocessing module configured to preprocess the biometric information obtained by the image obtaining module, in order to obtain a grayscale image of the biometric feature;
   a feature extraction module configured to extract feature points of the biometric feature from the grayscale image obtained by the image preprocessing module to obtain the biometric data relative to the feature points of the biometric feature.

3. The device according to claim 1, wherein the security chip further comprises:
   a memory module configured to store the biometric template, wherein the biometric template is generated during a registering phase by obtaining the biometric information sensed by the sensor and performing image preprocessing and feature extraction on the biometric information by use of the microprocessor; and
   a feature comparison module configured to compare the biometric data obtained by the microprocessor with the biometric template stored in the memory module, and determine that the biometric recognition result is passed if the biometric data matches the biometric template, otherwise determine that the biometric recognition result is failed.

4. The device according to claim 1, wherein the microprocessor is an individual hardware implementing a microcontroller unit and the security chip is an individual hardware implementing a security element.

5. The device according to claim 1, wherein the computing device is a smart phone or a tablet computer.

6. The device according to claim 1, wherein the system environment of the computing device is logically divided into security zones and non-security zones, and the device for biometric recognition is configured to send the biometric recognition result to the computing device through the security zones or the non-security zones.

7. The device according to claim 1, wherein the biometric feature comprises a fingerprint, the biometric information comprises image information of the fingerprint, the biometric data comprises feature point data of the fingerprint, and the biometric template comprises a feature template of the fingerprint.

8. A method for biometric recognition, executed in the computing device according to claim 1 and comprising:
   sensing biometric information of a biometric feature by a sensor in accordance with an instruction to identify the biometric feature;
   obtaining the biometric information from the sensor by a microprocessor, and performing image preprocessing and feature extraction on the obtained biometric information by the microprocessor, in order to obtain biometric data; and
   comparing the biometric data obtained by the microprocessor with a biometric template stored in a security chip to determine a biometric recognition result.

9. The method according to claim 8, wherein step of comparing the biometric data obtained by the microprocessor with the biometric template stored in the security chip to determine the biometric recognition result comprises: in the security chip, comparing the biometric data obtained by the microprocessor with the biometric template stored in the security chip, wherein if the biometric data matches the biometric template, the biometric recognition result is determined to be passed, otherwise the biometric recognition result is determined to be failed.

10. A method for registering a biometric template, executed in the computing device according to claim 1 and comprising:
   sensing biometric information by a sensor in accordance with an instruction to register the biometric template;
   obtaining the biometric information from the sensor by a microprocessor, performing image preprocessing and feature extraction on the obtained biometric information by the microprocessor, in order to obtain biometric data; and
   storing the biometric data obtained by the microprocessor as the biometric template in a security chip.

* * * * *